US006940815B2

(12) United States Patent
Usukura

(10) Patent No.: US 6,940,815 B2
(45) Date of Patent: Sep. 6, 2005

(54) PRIORITY CONTROL METHOD

(75) Inventor: Takashi Usukura, Tokyo (JP)

(73) Assignee: NEC Corporation, Tokyo (JP)

( * ) Notice: Subject to any disclaimer, the term of this patent is extended or adjusted under 35 U.S.C. 154(b) by 695 days.

(21) Appl. No.: 09/739,237

(22) Filed: Dec. 19, 2000

(65) Prior Publication Data

US 2001/0004363 A1 Jun. 21, 2001

(30) Foreign Application Priority Data

Dec. 20, 1999 (JP) ............................................ 11-361899

(51) Int. Cl.[7] .................................................. H04J 1/16
(52) U.S. Cl. ........................ 370/235; 370/338; 370/401; 370/418
(58) Field of Search ............................... 370/412–418, 370/229–235, 328, 338, 401

(56) References Cited

U.S. PATENT DOCUMENTS

| | | | | | |
|---|---|---|---|---|---|
| 4,942,569 | A | * | 7/1990 | Maeno | 370/230 |
| 5,583,792 | A | * | 12/1996 | Li et al. | 709/224 |
| 6,205,150 | B1 | * | 3/2001 | Ruszczyk | 370/412 |
| 6,260,073 | B1 | * | 7/2001 | Walker et al. | 709/249 |
| 6,317,416 | B1 | * | 11/2001 | Giroux et al. | 370/232 |
| 6,330,223 | B1 | * | 12/2001 | Shimonishi | 370/230 |
| 6,526,061 | B1 | * | 2/2003 | Briem | 370/395.42 |
| 6,567,415 | B1 | * | 5/2003 | Elwalid et al. | 370/412 |
| 6,570,873 | B1 | * | 5/2003 | Isoyama et al. | 370/375 |
| 6,594,263 | B1 | * | 7/2003 | Martinsson | 370/395.42 |
| 6,631,136 | B1 | * | 10/2003 | Chowdhury et al. | 370/395.31 |
| 6,674,743 | B1 | * | 1/2004 | Amara et al. | 370/351 |
| 6,683,879 | B1 | * | 1/2004 | Kado | 370/395.4 |

FOREIGN PATENT DOCUMENTS

| | | |
|---|---|---|
| JP | 7-135512 | 5/1995 |
| JP | A 10-229404 | 8/1998 |
| JP | 10-243016 | 9/1998 |

* cited by examiner

Primary Examiner—Zarni Maung
Assistant Examiner—Van Nguyen
(74) Attorney, Agent, or Firm—Young & Thompson

(57) ABSTRACT

Disclosed is a priority control method using a single output queue wherein an output priority of a packet not undergoing convergence is improved by exchanging the order of a packet undergoing convergence or a packet which may undergo convergence with the order of a packet not undergoing convergence.

10 Claims, 5 Drawing Sheets

PRIORITY CONTROL METHOD

FIELD OF THE INVENTION

The present invention relates to priority control method, and, more particularly, a priority control method, wherein, in a packet exchange unit having feedback convergence control, in order to prevent a packet not undergoing convergence control from a subsequent exit path from being deposited because the output queue is single and its head portion undergoes convergence control from the exit path so that the output queue is not output, a packet undergoing (or which may undergo) convergence control from the exit path and a packet not undergoing the convergence control are exchanged with each other in a range including the output queue and then, the packet not undergoing the convergence control is output with priority so as to improve availability of the output path, thereby reducing total capacity necessary for storing the packet in the output queue and preventing the priority of the order of a packet undergoing convergence detection by limiting an order exchanging range from being reduced too much.

BACKGROUND OF THE INVENTION

In a conventional priority control using a single output queue, because its output order is fixed, if a convergence detecting signal is input into a head packet, such a phenomenon that a subsequent packet cannot be output although it can be output because it does not receive a convergence detecting signal often occurs.

Because of this phenomenon, a sufficient capacity for storing successively input packets is necessary.

According to conventional technologies disclosed in for example, Japanese Patent Application Laid-Open No. 7-135512, Japanese Patent Application Laid-Open No. 10-65733, Japanese Patent Application Laid-open No. 10-243016 and the like, an increase of the capacity is suppressed by discarding an input packet early (Early Packet Discard method) or discarding a packet in a single input queue at random (Random Early Discard method).

Further, although a solution method in which plural queues are possessed for each output path has been proposed, separate controls for each path are necessary, so that a complicated control is required.

SUMMARY OF THE INVENTION

Accordingly, the present invention has been achieved in views of the conventional problems and therefore, an object of the invention is to provide a novel priority control method capable of solving the aforementioned problem existing in the conventional technology.

To achieve the above object, according to an aspect of the present invention, there is provided a priority control method using a single output queue wherein an output priority of a packet not undergoing convergence is improved by exchanging the order of a packet undergoing convergence or a packet which may undergo convergence with the order of a packet not undergoing convergence.

According to a preferred embodiment of the present invention, by setting an operation range for exchanging the order of the packet in a predetermined range, a priority of a packet whose priority is reduced because the packet undergoes convergence is prevented from being reduced too much.

According to another aspect of the present invention, a priority control method prioritizes packets in a queue that has a single output connected to plural output paths, where the packets are each addressed to a respective one of plural receiving units on the plural output paths. The priority control method includes the steps of receiving a convergence notice signal indicating that packets addressed to one of the receiving units are to be released from the queue with a lower priority than packets not addressed to the one receiving unit, and, for only a predetermined plurality of packets at a beginning of the queue, reversing an order of two consecutive packets in the queue when a first of the two consecutive packets is addressed to the one receiving unit and a second of the two consecutive packets is not addressed to the one receiving unit, and repeating these two steps after each release of a lead packet from the queue, until the packets addressed to the one receiving unit are no longer to be released with a lower priority.

According to a preferred embodiments of the present invention, the predetermined range including the output signal queue is set to a range controllable by the back/forth packet comparison and exchange means and not too large.

According to a preferred embodiment of the present invention, the exchange of output order of a packet not undergoing convergence control by the queue exchange instruction comprises: a first step of detecting an exit path in which a convergence notice signal is input; a second step of searching a portion including arranged packets of an exit path in which the convergence notice signal is not input, in the predetermined range and just after a packet to be sent to the exit path; a third step of exchanging both the packets in the portion; and a fourth step of, if a convergence notice signal is not input in a head packet after that, reading the packet normally and outputting the packet to the first or second output path.

According to a preferred embodiment of the present invention, the order exchange of the packet is carried out within a packet sending time interval.

DESCRIPTION OF THE PREFERRED EMBODIMENTS

Hereinafter, the preferred embodiments of the present invention will be described in detail with reference to the accompanying drawings.

Figure 1:
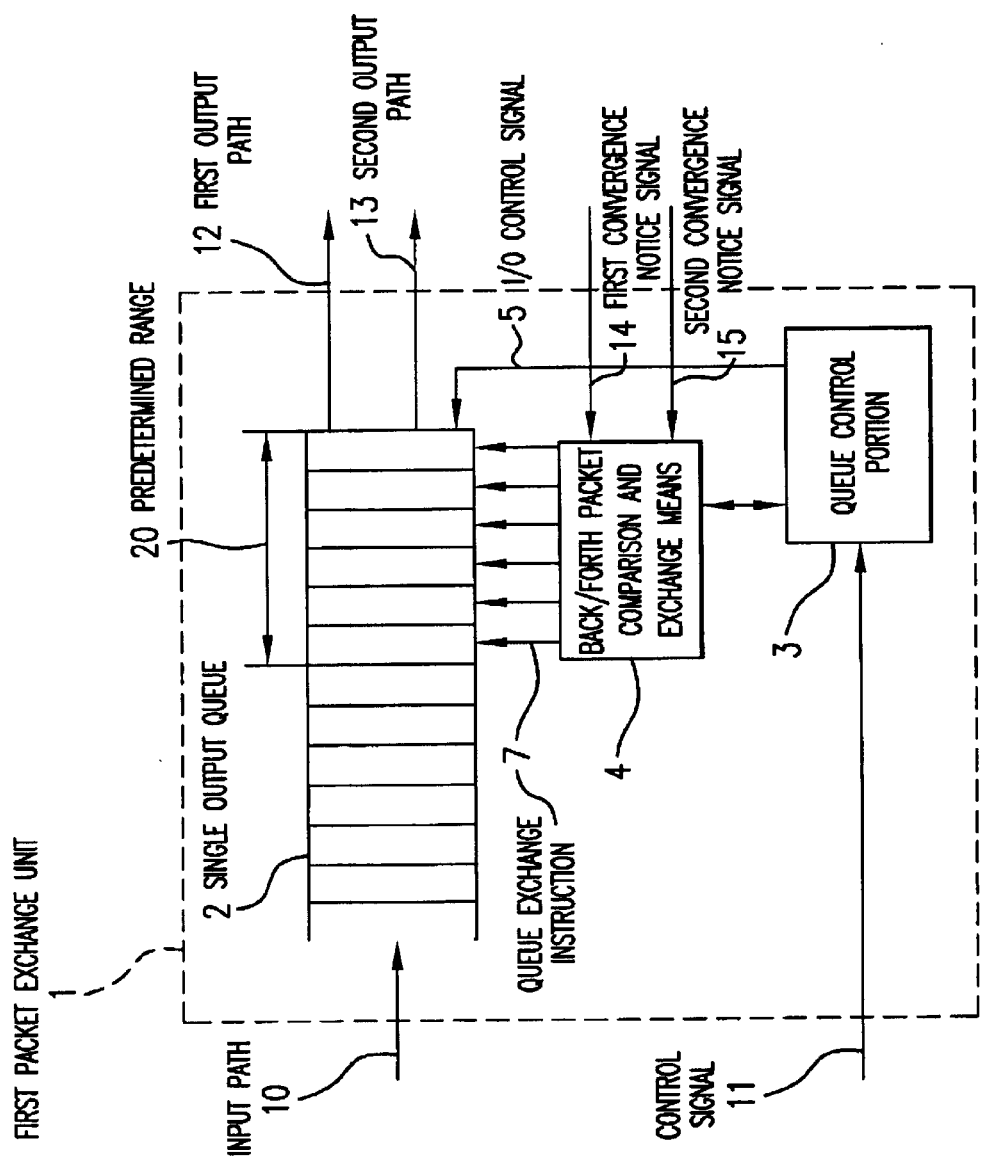
FIG. 1 is a block diagram of an output portion in a packet exchange apparatus in which an output queue for use in the priority control of the present invention is single.

FIG. 1 is a block diagram of an output portion 1 in a packet exchange apparatus in which an output queue for use in the priority control of the present invention is single.

[Configuration of the Embodiment]

Referring to FIG. 1, a packet input through an input path 10 is stored successively into a single output queue 2.

If a first convergence notice signal 14 or a second convergence notice signal 15 is not input into a back/forth packet comparison and exchange means 4, an input packet is output to a first output path 12 or a second output path 13 in the order of input by an I/O control signal from a queue control portion 3. In order to determine an output path at this time, a well known method using the packet header is employed.

If the first convergence notice signal 14 or the second convergence notice signal 15 is input to the back/forth comparison and exchange means 4, a queue exchange instruction 7 is output to individual packets to be output to the first output path 12 or the second output path 13 in a predetermined range 20 of the output queue 2.

The predetermined range 20 is set up to a range which can be controlled by the back/forth packet comparison and exchange means 4 and is not too wide. If the predetermined range 20 is set wide, the priority of a packet in an exit path in which the convergence notice signal is input may sharply drop when the convergence notice signal is released.

Figure 2:
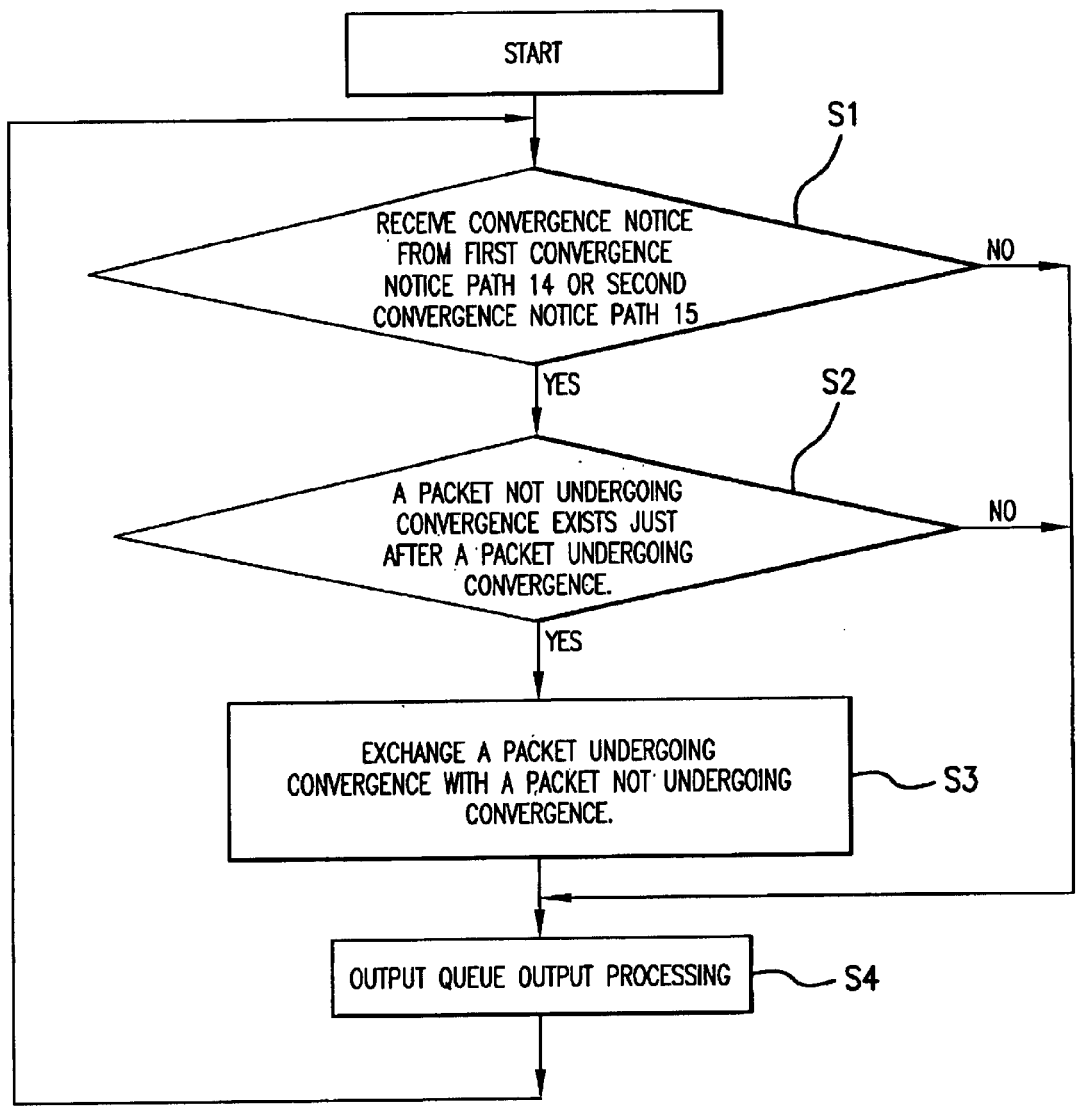
FIG. 2 is a flowchart showing an example of operation for exchanging queue of the present invention.

The queue exchange instruction 7 exchanges individual packets following a flow chart shown in FIG. 2.

First, an exit path in which the convergence notice signal is input is detected (condition branch step S1).

Next, a portion of the exit path where a packet not containing a convergence notice signal is arranged just after a packet containing the convergence notice is searched in the predetermined range 20 (condition branch step S2).

An order of both the packets in this portion is exchanged (step S3).

After that, if the head packet contains no convergence notice signal, normal packet reading is carried out and its result is output to the first output path 12 or second output path 13 (step S4).

The order exchange is carried out within a packet sending time interval.

According to this embodiment, there are two output paths and convergence notice signals. However, they may be more than two and the output path itself may be physical individual path or logical common path.

Setting and change of the parameter in the queue control portion 3 are carried out by a control apparatus (not shown) through the control signal 11.

Although in the above description, the back/forth packet comparison and exchange means is composed in software, it may be composed in hardware using a comparison means, memory and the like.

[Operation of the Embodiment]

Next, an operation of one embodiment of the present invention will be described with reference to drawings.

Figure 3:
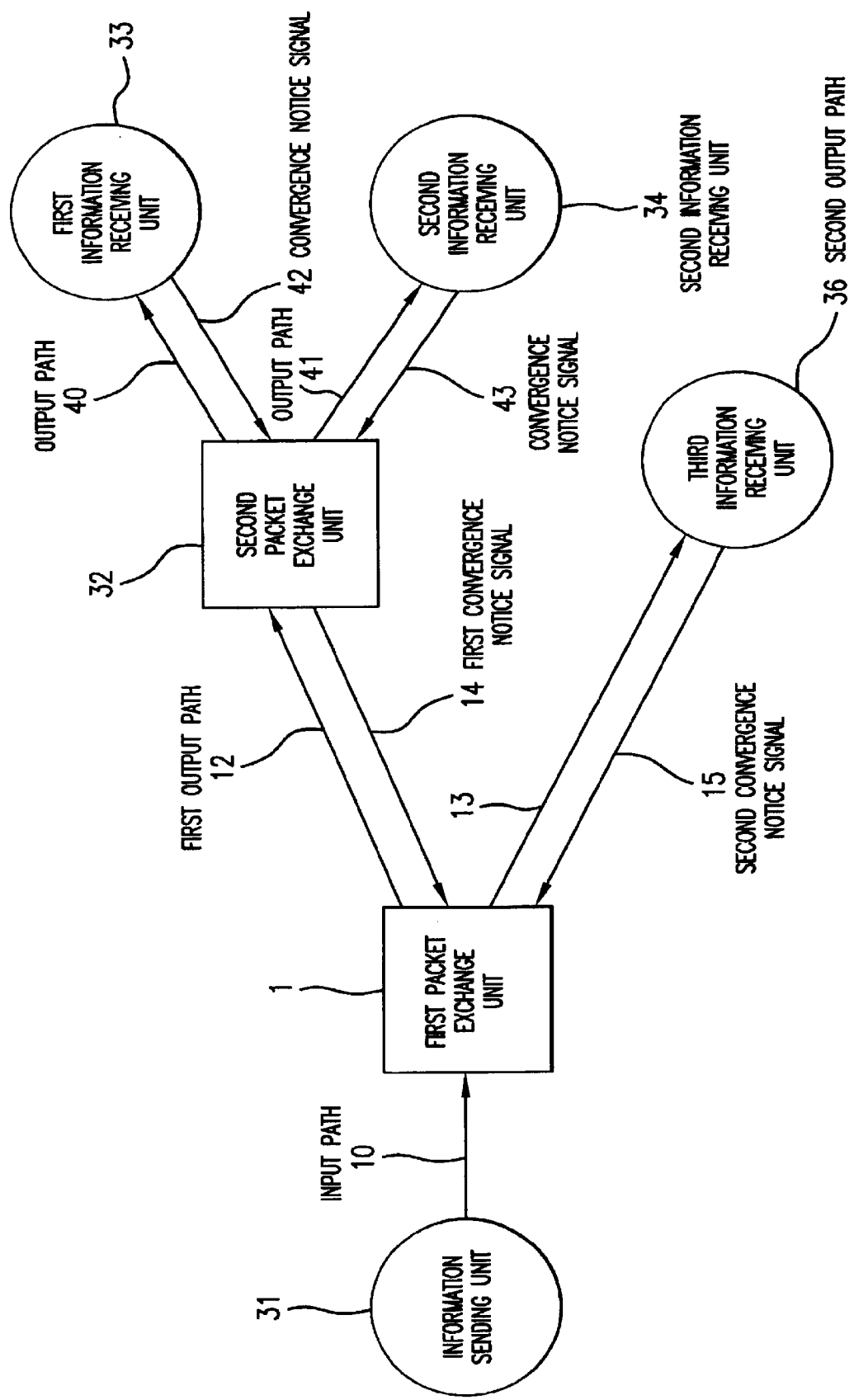
FIG. 3 is a block configuration diagram showing an example of connection of a first packet exchange apparatus having an input path and three output paths.

FIG. 3 is a block structure diagram showing an example of a connection structure of a first packet exchange unit 1 having an input path and three output paths.

Referring to FIG. 3, a packet output from an information sending unit 31 is exchanged by the first packet exchange unit 1 and finally, input to a first information receiving unit 33, second information receiving unit 34 and third information receiving unit 35.

A second packet exchange unit 32 having two input paths and two output paths is provided on paths leading to the first information receiving unit 33 and second information receiving unit 34 and executes the same operation as the first packet exchange unit 1. In this example, in the first output path 12 and first convergence notice signal 14, output paths and convergence notice signal to two receiving units which are the first information receiving unit 33 and the second information receiving unit 34 are logically multiplexed.

Figure 4:
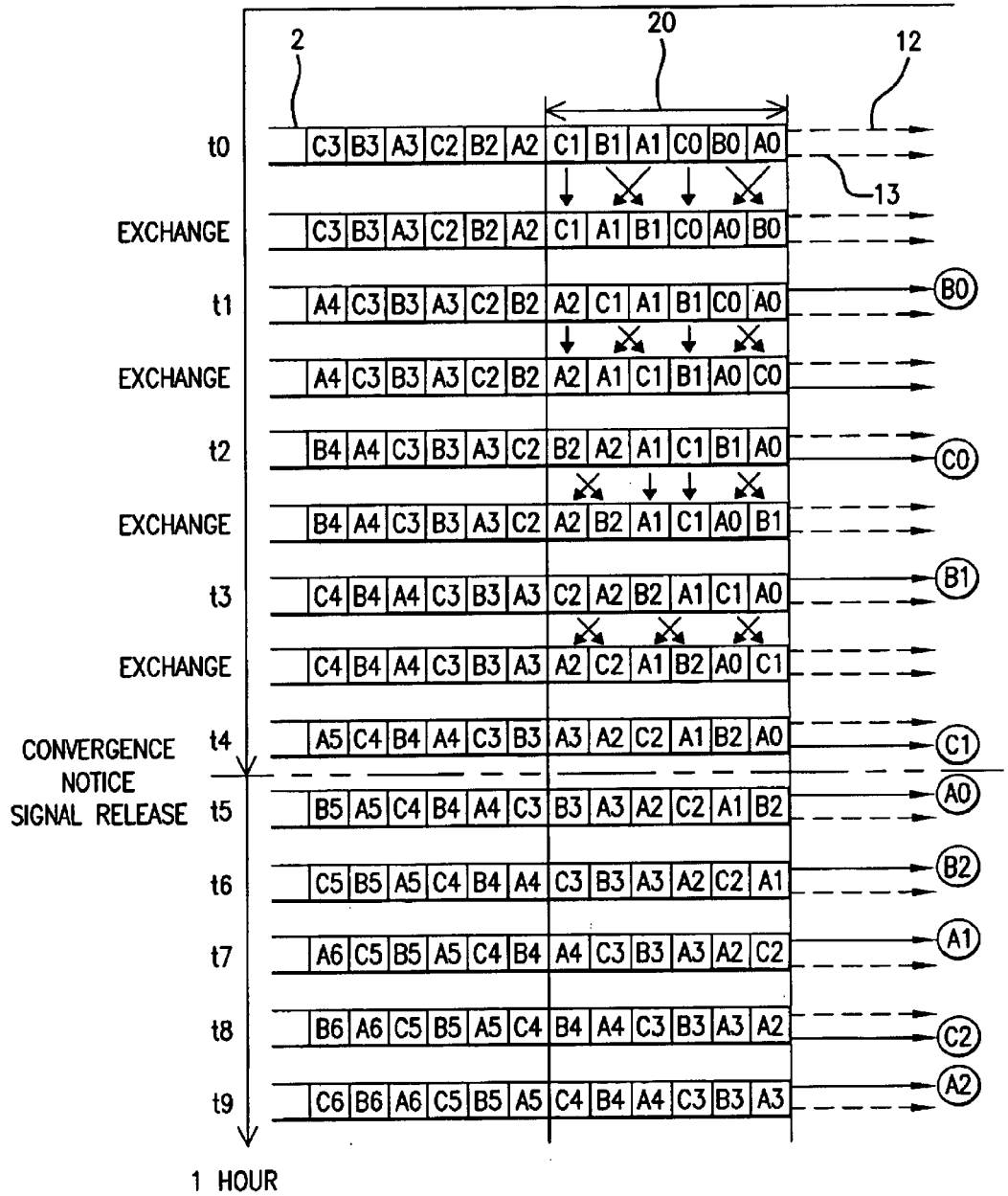
FIG. 4 is a timing chart showing input/output condition of the packet at each packet time in output queue.

FIG. 4 is a diagram (timing chart) showing I/O condition of a packet at each packet time in output queue 2.

Referring to FIG. 4, a predetermined interval 20 is for example, six packets. It is assumed that the same quantity of the packet is sent from the information sending unit 31 to the first to third information receiving units 33 to 35 and that a convergence notice signal from the first information receiving unit 33 is input into the first packet exchange unit 1 in an interval from time t0 to t4. Here, A0–A6, B0–B6 and C0–C6 indicate packets to be output to the first information receiving unit 33, second information receiving unit 34 and third information receiving unit 35, respectively.

Because the convergence notice signal is input to the head packets A0–A1 at time t0, the order of the packet is exchanged in a predetermined range 20 according to the flow chart of FIG. 2. By exchanging the order, the head packet at time t1 is B0 and output without undergoing the convergence control. Likewise, the exchange of the order and output are repeated from time t1 to t4.

Because the convergence notice signal is released after time t5, the order of the packet is not exchanged and the packets are output successively from the head.

Because during the above-described operation, the availability of the output path is not reduced, total capacity necessary for storing the packet in the single output queue 2 is not changed and such an event that the packet is not input but discarded never occurs.

Further, such an event that after the convergence notice signal is released, the order priority in queue A0–A6 drops too much never occurs.

Figure 5:
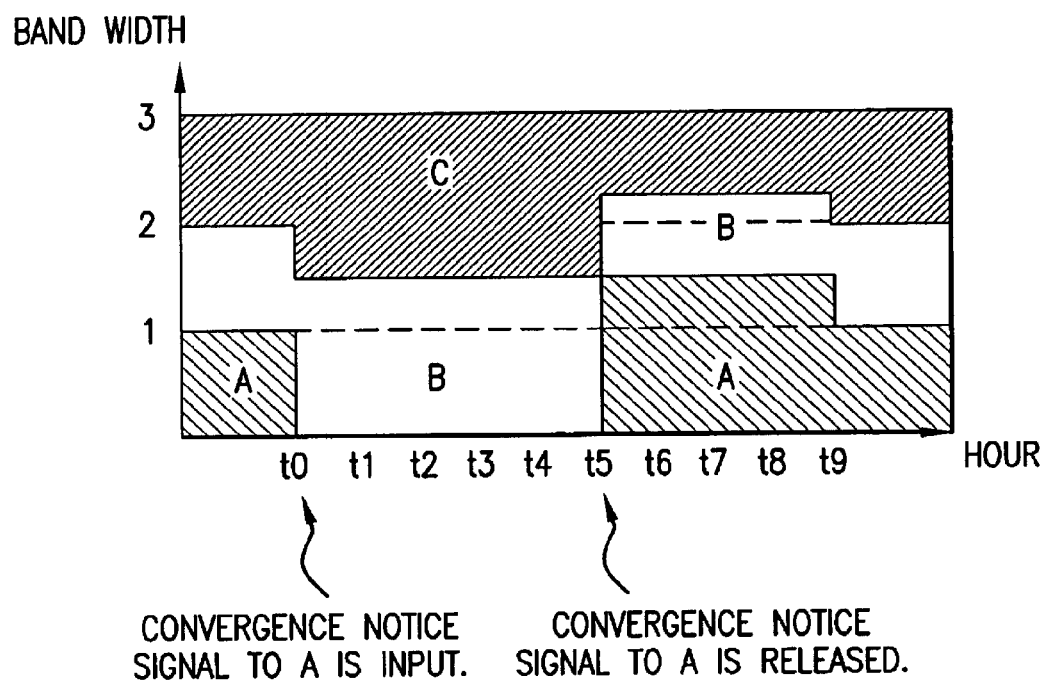
FIG. 5 is a diagram showing an average output band width in a sequential operation if it is assumed that the sizes of all packets are equal.

FIG. 5 shows an average output band width in a sequential operation if it is assumed that the sizes of all packets are equal. In FIG. 5, the input band width is totally 3 (1 each for A, B, C).

The present invention has the above-described structure and operation. According to the present invention, following effects are secured.

1. It is possible to suppress such a phenomenon that a rear portion not undergoing convergence control of a single queue cannot be output because a head packet undergoes the convergence control.

2. Because a possibility that the output path may be clogged by a convergence detecting signal is reduced, total capacity necessary for a single output queue can be reduced.

3. By setting a predetermined range in which the packet order is exchanged appropriately, it is possible to prevent the priority of a packet in a output path which receives a convergence detecting signal and after a while, is released from the convergence detecting signal from being lowered excessively.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A method of prioritizing packets in a queue with a single output, where the packets are each addressed to a respective one of plural receiving units, the method comprising the steps of:

indicating that packets addressed to one of the receiving units are to be released from the queue with a lower priority than other packets not addressed to the one receiving unit; and exchanging two of the packets for each other in the queue when a first of the two packets is addressed to the one receiving unit and a second of the two packets subsequent to the first packet is not addressed to the one receiving unit.

2. The method of claim 1, wherein the exchanging step occurs only in a predetermined plurality of the packets at the beginning of the queue.

3. The method of claim 1, wherein the exchanging step occurs each time the lead packet in the queue is released, until the packets addressed to the one receiving unit are no longer to be released with a lower priority.

4. The method of claim 1, wherein the exchanging step occurs within a time period for sending one of the packets.

5. The method of claim 1, further comprising the steps of indicating that the packets addressed to the one receiving unit are no longer to be released with a lower priority and thereafter releasing the packets from the queue without changing their order.

6. The method of claim 1, wherein the indicating step comprises the steps of sending from the one receiving unit a convergence notice signal indicating that packets addressed to the one receiving unit are to be released from the queue with a lower priority.

7. A method of prioritizing packets in a queue with a single output, where the packets are each addressed to a respective one of plural receiving units, the method comprising the steps of:

receiving a notice that packets addressed to one of the receiving units are to be released from the queue with a lower priority than other packets;

for only a predetermined plurality of packets at a beginning of the queue, reversing an order of two consecutive packets in the queue when a first of the two consecutive packets is addressed to the one receiving unit and a second of the two consecutive packets is addressed to another of the receiving units; and repeating the first two steps after each release of a lead packet from the queue, until the packets addressed to the one receiving unit are no longer to be released with a lower priority.

8. The method of claim 7, further comprising step of sending from the one receiving unit a convergence notice signal, which is the notice that packets addressed to the one receiving unit are to be released from the queue with a lower priority than other packets.

9. A method of prioritizing packets in a queue with a single output connected to plural output paths, the method comprising the steps of:

addressing each of the packets to a respective one of plural receiving units on the plural output paths;

receiving a convergence notice signal indicating that packets addressed to one of the receiving units are to be released from the queue with a lower priority than packets not addressed to the one receiving unit; and in only a predetermined plurality of packets at a beginning of the queue, reversing an order of two packets in the queue when a first of the two packets is addressed to the one receiving unit and a second of the two packets following the first packet is not addressed to the one receiving unit.

10. The method of claim 9, further comprising step of sending the convergence notice signal from the one receiving unit.

* * * * *